United States Patent
Suzuki et al.

(10) Patent No.: US 10,703,272 B2
(45) Date of Patent: Jul. 7, 2020

(54) VEHICLE DEVICE, AND NON-TRANSITORY TANGIBLE COMPUTER READABLE MEDIUM

(71) Applicant: DENSO CORPORATION, Kariya, Aichi-pref. (JP)

(72) Inventors: Takamitsu Suzuki, Kariya (JP); Masayuki Kondo, Kariya (JP); Yuji Kusunose, Kariya (JP)

(73) Assignee: DENSO CORPORATION, Kariya, Aichi-pref. (JP)

(*) Notice: Subject to any disclaimer, the term of this patent is extended or adjusted under 35 U.S.C. 154(b) by 0 days.

(21) Appl. No.: 16/089,273

(22) PCT Filed: Jan. 16, 2017

(86) PCT No.: PCT/JP2017/001217
§ 371 (c)(1),
(2) Date: Sep. 27, 2018

(87) PCT Pub. No.: WO2017/168953
PCT Pub. Date: Oct. 5, 2017

(65) Prior Publication Data
US 2019/0111844 A1    Apr. 18, 2019

(30) Foreign Application Priority Data

Apr. 1, 2016    (JP) .................................. 2016-074383
Nov. 8, 2016    (JP) .................................. 2016-218084

(51) Int. Cl.
*G02B 5/32*      (2006.01)
*B60R 1/00*      (2006.01)
(Continued)

(52) U.S. Cl.
CPC ............... *B60R 1/00* (2013.01); *B60K 35/00* (2013.01); *G02B 27/0179* (2013.01);
(Continued)

(58) Field of Classification Search
CPC ............... B60R 1/00; B60R 2300/205; B60R 2300/304; B60R 2300/306; B60K 35/00;
(Continued)

(56) References Cited

U.S. PATENT DOCUMENTS

2002/0089756 A1    7/2002    Aoki et al.
2004/0183750 A1    9/2004    Nagano et al.
(Continued)

FOREIGN PATENT DOCUMENTS

JP    2003039983 A    2/2003
JP    2005069800 A    3/2005
(Continued)

*Primary Examiner* — Munear T Akki
(74) *Attorney, Agent, or Firm* — Harness, Dickey & Pierce, P.L.C.

(57) ABSTRACT

An ECU as a vehicle device includes an image generation unit that generates an image in a predetermined reference coordinate system, a viewpoint position identification unit that identifies a viewpoint position of a driver; a superimposed position identification unit that identifies a display position at which the image is displayed within an eyesight of the driver; an image conversion unit that generates a converted image obtained by converting the image into a coordinate system having the viewpoint position of the driver as a reference point; and a notification unit that displays a display image falling within the converted image so as to be superimposed on the eyesight of the driver with the projection device.

11 Claims, 8 Drawing Sheets

(51) Int. Cl.
  *G02B 27/01* (2006.01)
  *B60K 35/00* (2006.01)
  *G06F 3/01* (2006.01)

(52) U.S. Cl.
  CPC ........ *G06F 3/013* (2013.01); *B60K 2370/334* (2019.05); *B60K 2370/736* (2019.05); *B60R 2300/205* (2013.01); *B60R 2300/304* (2013.01); *B60R 2300/306* (2013.01); *B60R 2300/308* (2013.01); *G02B 2027/0181* (2013.01)

(58) Field of Classification Search
  CPC ........ B60K 2370/736; B60K 2370/334; G02B 27/0179; G02B 2027/0181; G06F 3/013; B60B 2300/308
  See application file for complete search history.

(56) References Cited

U.S. PATENT DOCUMENTS

| | | | |
|---|---|---|---|
| 2005/0154505 A1* | 7/2005 | Nakamura | G01C 21/365 701/1 |
| 2009/0303158 A1* | 12/2009 | Takahashi | G02B 27/0093 345/7 |
| 2012/0050138 A1* | 3/2012 | Sato | G02B 27/01 345/4 |
| 2012/0268262 A1* | 10/2012 | Popovic | B60Q 9/008 340/438 |

FOREIGN PATENT DOCUMENTS

| | | |
|---|---|---|
| JP | 2005148973 A | 6/2005 |
| JP | 2011105306 A | 6/2011 |
| JP | 2015087619 A | 5/2015 |
| JP | 2015226304 A | 12/2015 |
| JP | 2016025394 A | 2/2016 |

* cited by examiner

VEHICLE DEVICE, AND NON-TRANSITORY TANGIBLE COMPUTER READABLE MEDIUM

CROSS REFERENCE TO RELATED APPLICATIONS

This application is a U.S. National Phase Application under 35 U.S.C. 371 of International Application No. PCT/JP2017/001217 filed on Jan. 16, 2017. This application is based on and claims the benefit of priority from Japanese Patent Applications No. 2016-074383 filed on Apr. 1, 2016, and No. 2016-218084 filed on Nov. 8, 2016. The entire disclosures of all of the above applications are incorporated herein by reference.

TECHNICAL FIELD

The present disclosure relates to a vehicle device, a vehicle program, and a filter design program.

BACKGROUND ART

There is a projection device that superimposes and displays an image on a scenery seen by a driver by causing the image to be transparently displayed on a projection surface such as windshield. In recent years, with the use of the projection device, a vehicle device that supports driving by, for example, indicating a route direction at a complicated intersection by an arrow according to a road actually traveling, or framing a road sign so as to urge a driver to pay attention has also emerged.

Meanwhile, a position of a driver's face is not necessarily located at a fixed position. For that reason, depending on the position of the driver's face, the superimposed and displayed image may be displayed with deviation from a real scenery, and advantages of the projection device displaying the image on the real scenery in a superimposed manner cannot be utilized in some cases. Also, the display of the image at a deviated position may cause the driver to misunderstand. For that reason, for example, Patent Literature 1 has proposed that a method for displaying the image is devised to alleviate an image shift caused by the driver's viewpoint position.

PRIOR ART LITERATURES

Patent Literature

Patent Literature 1: JP-2005-69800-A

SUMMARY

However, as a result of detailed studies by the present inventors, a size of the projection surface is limited, and in the case where the position of the face of the driver is shifted up and down, front and rear, right and left, and so on, the position of the driver's eyes is also shifted. Therefore, the present inventors have found out such a problem that a fundamental positional deviation of the display position cannot be solved because of a deviation of a positional relationship between the position of the driver's eyes and the projection surface and the like.

It is an object of the present disclosure to provide a vehicle device, a vehicle program, and a filter design program which are capable of accurately displaying an image projected from a projection device so as to be superimposed on a real scenery viewed by a driver.

A vehicle device according to an aspect of the present disclosure includes: an image generation unit that generates an image to be notified to a driver in a predetermined reference coordinate system; a viewpoint position identification unit that identifies a viewpoint position indicative of a position of driver's eye in a vehicle compartment based on the position of the driver's eye detected by a viewpoint detection unit for detecting the position of the driver's eye; a superimposed position identification unit that identifies a display position, at which a generated image is displayed within an eyesight of the driver; an image conversion unit that generates a converted image obtained by converting the generated image into a coordinate system having the viewpoint position of the driver; and a notification unit that notifies the driver of the information by displaying the converted image to be superimposed on the eyesight of the driver with the projection device.

BRIEF DESCRIPTION OF DRAWINGS

The above and other objects, features and advantages of the present disclosure will become more apparent from the following detailed description made with reference to the accompanying drawings. In the drawings.

EMBODIMENTS

Hereinafter, an embodiment will be described with reference to FIGS. 1 to 6.

Figure 1:
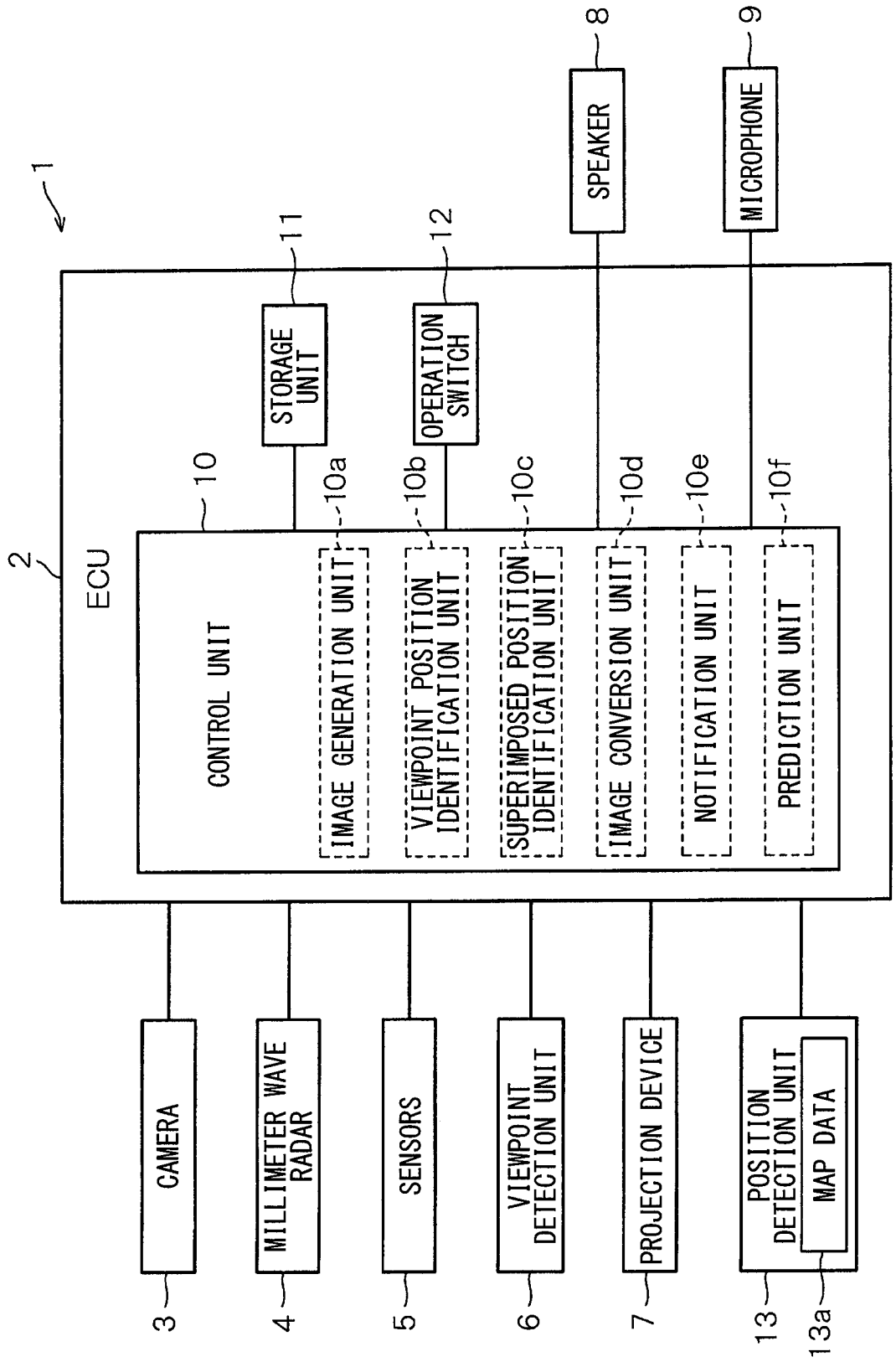
FIG. 1 is a diagram schematically showing an electrical configuration of an ECU according to a first embodiment.

As shown in FIG. 1, the vehicle system 1 includes an ECU 2 (electronic control unit) as a vehicle device, a camera 3 as an imaging unit, a millimeter wave radar 4, sensors 5, a viewpoint detection unit 6, a projection device 7, a speaker 8, a microphone 9, and the like.

Figure 2:
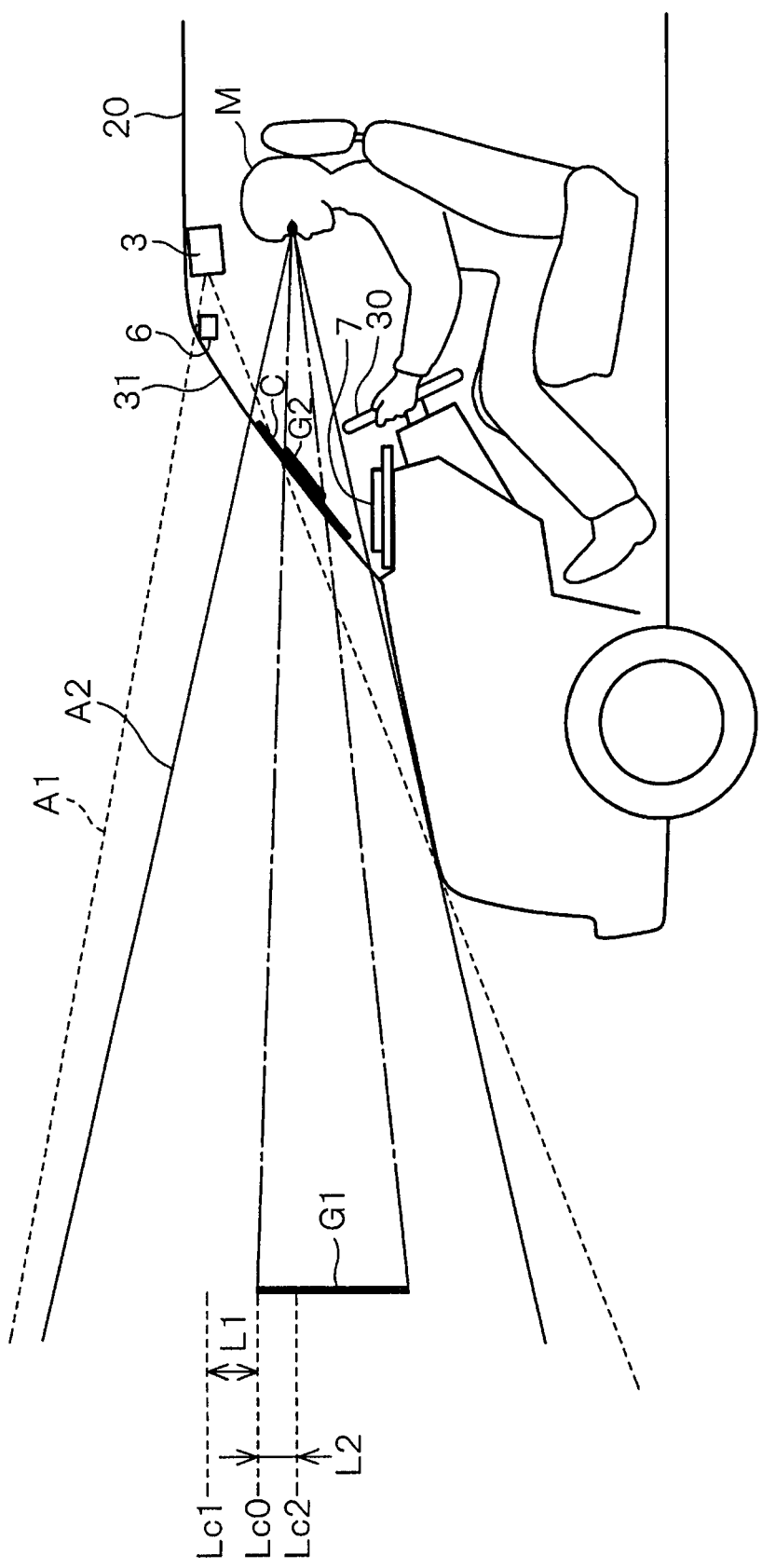
FIG. 2 is a diagram schematically showing an example of a relationship between a viewpoint position of a camera and a viewpoint position of a driver.

The ECU 2 is installed in a vehicle 20 (refer to FIG. 2). The ECU 2 may be fixedly provided in the vehicle 20 or may be provided detachably from the vehicle 20. The ECU 2 includes a control unit 10, a storage unit 11, an operation switch 12, and the like. The control unit 10 is configured by a microcomputer including a CPU, a ROM, a RAM, and the like not shown. The control unit 10 controls the ECU 2 with the execution of a control program stored in the storage unit 11, for example.

The storage unit 11 is configured by a recording medium capable of reading and writing data, and stores the control program described above, a vehicle program to be described later, a program for image processing, and various pieces of data. In other words, the storage unit 11 functions as a recording medium for storing the vehicle program. Further, the storage unit 11 functions as a recording medium for storing a filter design program which will be described later. However, the recording medium is not limited to the storage unit 11, but can be also configured by a recording medium detachable from the ECU 2.

In addition, the storage unit 11 also stores data such as an attachment position of the camera 3, a three-dimensional shape of a projection surface (C; refer to FIG. 2), and a driver's dominant eye. The operation switch 12 inputs various operations of the user to the ECU 2.

The control unit 10 includes an image generation unit 10*a*, a viewpoint position identification unit 10*b*, a superimposed position identification unit 10*c*, an image conversion unit 10*d*, a notification unit 10*e*, a estimation unit 10*f*, and the like. In the present embodiment, those units (10*a* to 10*e*) are realized by software by executing a program in the control unit 10. However, those units (10*a* to 10*e*) can be provided by hardware, or can be provided by a combination of hardware and software.

The image generation unit 10*a* generates an image (G1; refer to FIG. 2) to be notified the driver of in a coordinate system based on a viewpoint position of the camera 3 that images a traveling direction of the vehicle 20. In other words, in the present embodiment, the reference coordinate system is set as a coordinate system based on the attachment position of the camera 3. The image generation unit 10*a* generates an image as an image which is displayed in the eyesight of the camera 3 based on the attachment position of the camera 3.

In this example, the image (G1) shown in FIG. 2 is actually projected on the projection surface (C). However, in FIG. 2, the image (G1) is shown at a position separated from the vehicle 20 in order to schematically show that the image is visible to the driver so that the image is present at a certain distance.

In addition, for simplicity of description, FIG. 2 shows an example in which the image (G1) is a simple two-dimensional image, but naturally, the image (G1) may be an image with a complicated shape that looks three-dimensionally as viewed from the driver. In that case, a three-dimensional stereoscopic image having a depth like a so-called 3D image will be displayed to the driver without any discomfort in the eyesight.

The viewpoint position identification unit 10*b* identifies a viewpoint position indicating a position of the driver's eyes in a vehicle compartment based on the position of the driver's eyes detected by the viewpoint detection unit 6. In other words, the viewpoint position identification unit 10*b* identifies a positional relationship between the position of the driver's eyes and the projection surface (C).

The superimposed position identification unit 10*c* specifies a display position at which to display the image on the projection surface (C), that is, the display position at which to display the image based on the viewpoint position of the driver, based on the viewpoint position of the camera 3 and the viewpoint position of the driver.

The image conversion unit 10*d* converts the image into a coordinate system with the viewpoint position of the driver as a reference based on the viewpoint position of the driver, to thereby generate the converted image (G2; refer to FIG. 2), that is, an image to be actually projected onto the projection surface (C).

The notification unit 10*e* notifies the driver of the converted image by displaying the converted image (G2) so as to be superimposed on the eyesight of the driver with the use of the projection device 7. At this time, the notification unit 103 displays the image in real time following a change in the viewpoint position of the driver as will be described later. Character information and the like may be displayed together.

The estimation unit (10*f*) estimates the viewpoint position of the driver based on the travel history indicating a change in the viewpoint position of the driver in chronological order.

The camera 3 is configured by a CCD camera or a CMOS camera, and images a scenery in the traveling direction of the vehicle 20. The millimeter wave radar 4 radiates a radio wave and detects a distance to an object based on a reflected wave reflected from the object. The sensors 5 are configured by, for example, an infrared sensor, a proximity sensor, or the like, and detect surrounding objects.

The viewpoint detection unit 6 detects the position of the driver's eyes. Since various methods are well known or publicly known, the viewpoint detection unit 6 may use those methods. In that case, it is desirable that the position of the driver's eyes can be detected without requiring a special equipment for the driver such that the position of the eyes is detected by only the image processing.

The projection device 7 is configured to project a virtual image on a transparent windshield 31 (refer to FIG. 2) or a combiner provided in the eyesight of the driver, and is a device called a head-up display. In the present embodiment, a part of the windshield 31 is set as the projection surface (C).

The speaker 8 notifies of a response sound of the operation on the ECU 2, a message to the driver, or the like by voice. The notification may be performed by the speaker 8. The microphone 9 inputs the operation on the ECU 2, for example, by voice.

Further, the ECU 2 is connected to the position detection unit 13. The position detection unit 13 is configured by a GPS unit, a navigation apparatus, or the like, and detects a current position of the host vehicle. Further, in order to realize a navigation function, the ECU 2 has map data 13*a*. The map data 13*a* may be stored in the storage unit 11.

Next, the action of the configuration described above will be described.

As described above, various pieces of information are displayed so as to be superimposed on the real scenery with the use of the projection device 7, resulting in an advantage that a risk which of the user may not be aware can be notified the user of, or the like. On the other hand, if a positional deviation between the real scenery and the superimposed image occurs, there is a possibility that the advantage may not be obtained, or erroneous information may be given.

In this example, a difference between the viewpoint position of the camera 3 and the viewpoint position of the driver, and the necessity of obtaining the superimposed position will be described. As shown in FIG. 2, it is assumed that the camera 3 is attached to a position close to a ceiling in the vehicle compartment of the vehicle 20 so as to image a front of the vehicle 20. The viewpoint position of the camera 3, that is, a center position of the eyesight (A1) of the camera 3 can be obtained from the attachment position of the camera 3.

The eyesight (A2) of the driver (M) is identified by detecting the position of the eyes of the driver (M) by the viewpoint detection unit 6 provided in the vehicle compartment.

When a real scenery is imaged by the camera 3, and the image (G1) which is superimposed on the real scenery is generated by the image generation unit 10a, the image generation unit 10a generates the image (G1) so as to be superimposed on the scenery in the eyesight (A1) of the camera 3. In this situation, a position of an upper end of the image (G1) in the eyesight (A1) of the camera 3 is referred to as an upper end position (Lc0) for the sake of convenience.

For example, it is assumed that the image (G1) generated with the viewpoint position of the camera 3 as a reference is positioned lower than a center line (Lc1) of the camera 3 by a distance (L1). In other words, it is assumed that the image (G1) is positioned lower than the center in the coordinate system of the eyesight (A1) of the camera 3.

On the other hand, the image (G1) is located at a distance (L2) above the center line (Lc2) with respect to the eyesight (A2) of the driver (M). In other words, the image (G1) is located above the center in the coordinate system of the driver (M).

For that reason, when the image (G2) is displayed in the coordinate system based on the viewpoint position of the camera 3, since the projection surface (C) is provided between the driver (M) and the real scenery, the image (G2) is displayed below the center line (Lc2) with respective to the driver (M). As a result, the image (G2) is superimposed on the scenery viewed by the driver (M).

Figure 3:
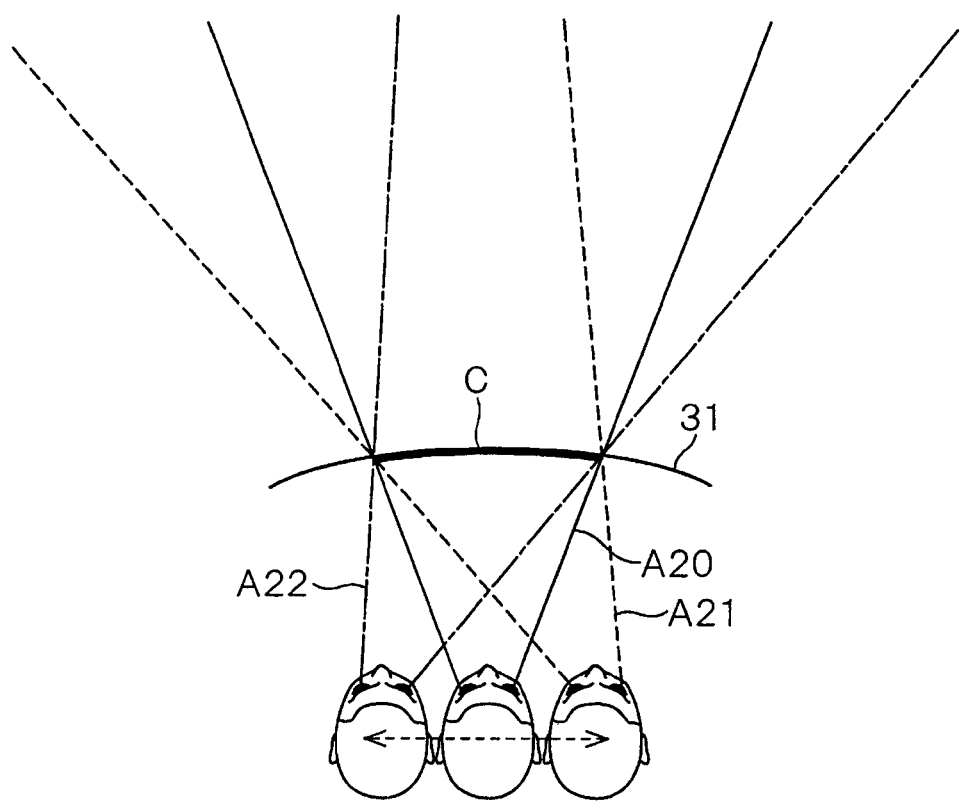
FIG. 3 is a diagram schematically showing an example of a relationship between a position of a driver's face and an eyesight.
Figure 4:
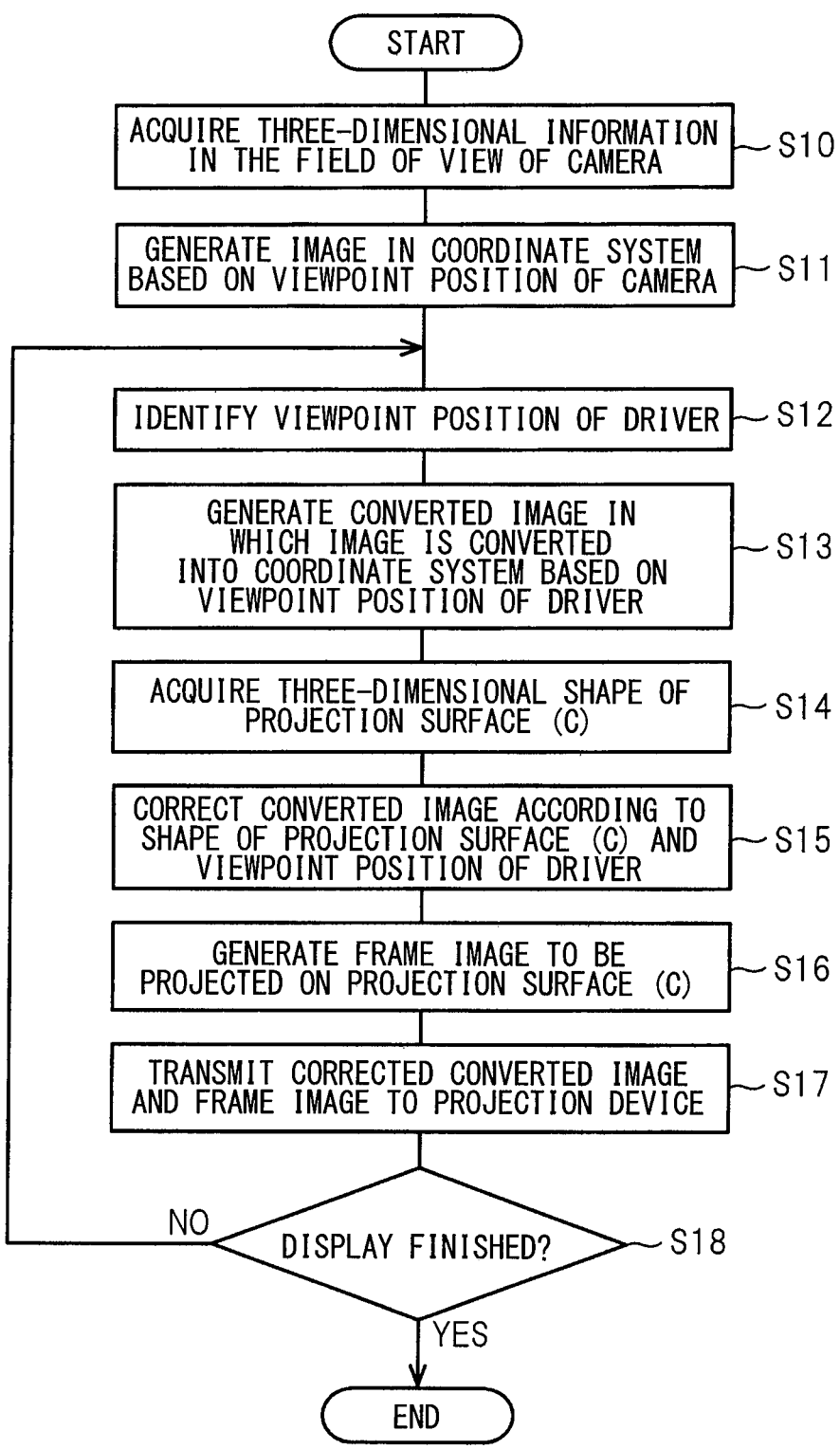
FIG. 4 is a diagram showing a flow of processing of a vehicle program by the ECU.

The same is applied to a case in which the position of the face of the driver (M) is shifted to the right and left as shown in FIG. 3. For that reason, the scenery viewed through the projection surface (C) is different among the eyesight (A20, corresponding to A2 described above) when the position of the face of the driver (M) is at the center position, the eyesight (A21) when the position of the face is shifted to the right, and the eyesight (A22) when the position of the face is shifted to the left. Therefore, the image (G1) may not be properly superimposed on the scenery. Hereinafter, the center position is also referred to as a normal position for convenience. Also, for example, a relative position of the face is different between a relatively tall driver and a relatively short driver, and even if the driver is the same, the position of the face may be different because a driver's posture changes as appropriate during driving, a seat is reclined, or the like.

Therefore, the ECU2 enables the image projected from the projection device 7 to be displayed accurately so as to be superimposed on the real scenery viewed by the driver as described below. More specifically, the ECU 2 generates, converts and displays the image in real time so as to follow a change of the scenery caused by the movement of the vehicle 20 and a change in the viewpoint position of the driver so as to be superimposed on the eyesight of the driver.

The ECU 2 executes the respective processes shown in FIG. 3. Those processes are carried out by executing the vehicle program in the control unit 10. The respective processes are performed by the respective units (10a to 10e) described above, but for the sake of simplicity of description, the ECU 2 will be mainly described below.

First, the ECU 2 acquires three-dimensional information within the eyesight (A1) of the camera 3 (S10). In other words, the ECU 2 picks up a scenery in front of the vehicle 20 with the camera 3, and detects or extracts an object or the like included in the image. Then, the ECU 2 generates an image (G1) to be notified the driver of in a coordinate system based on the viewpoint position of the camera 3 (S11).

Subsequently, the ECU2 identifies the viewpoint position of the driver (S12), and generates a converted image (G2, refer to FIG. 2) in which the generated image (G1) is converted into a coordinate system based on the viewpoint position of the driver (S13). In other words, the ECU 2 performs a conversion process for converting the generated image (G1) into the converted image (G2). At that time, the ECU 2 does not perform the conversion process on an entire display screen, but performs the conversion process on the image to be notified the driver of. As a result, a processing load is reduced.

In this example, as a coordinate transformation technique for converting to the coordinate system based on the viewpoint position of the driver, for example, a so-called view transformation method is conceivable. Since the view transformation is a technique commonly used in the field of graphics handling a three-dimensional image, an outline of the view transformation will be described below.

The view transformation is a diagram method for expressing a figure generated in a state viewed from a certain viewpoint position by a state viewed from a different viewpoint position in a three-dimensional space. Specifically, in the view transformation, the transformation of an image is performed by a combination of a coordinate transformation in which a position of the image in the reference coordinate system in which a figure is generated is shifted in parallel so as to comply with a coordinate system based on the viewpoint position of a person who views the figure with the use of a parallel transformation matrix, and a coordinate transformation in which the parallel moved image is rotated toward the position of the viewpoint with the use of a rotation transformation matrix.

In Step S13 described above, with the use of the diagram method of the above view transformation, the ECU 2 converts the image (G1) generated in the reference coordinate system based on the camera 3 into the converted image (G2) converted into the coordinate system based on the viewpoint position of the driver who actually views the generated image. At this time, if the image is a three-dimensional image, the conversion is performed in a state that the image is stereoscopically visible with depth.

When projecting the converted image (G 2), there is a need to consider a shape of the projection surface (C). This is because, for example, if the converted image (G1) is a square, when the converted image (G1) is projected onto the projection surface (C) as it is, the image may be distorted depending on a surface shape of the projection surface (C) so that the image appears a figure shaped in a trapezoid or a complicated curve. Also, the image may be distorted depending on the viewpoint position of the driver, that is, a positional relationship between the position of the face of the driver and the projection surface (C).

Therefore, the ECU 2 acquires a three-dimensional shape, that is, a surface shape of the projection surface (C) (S14) and corrects the converted image (G1) according to the surface shape and the viewpoint position of the driver (S15). As a result, a corrected converted image (G2), that is, an image without distortion as viewed from the driver is generated.

Figure 5:
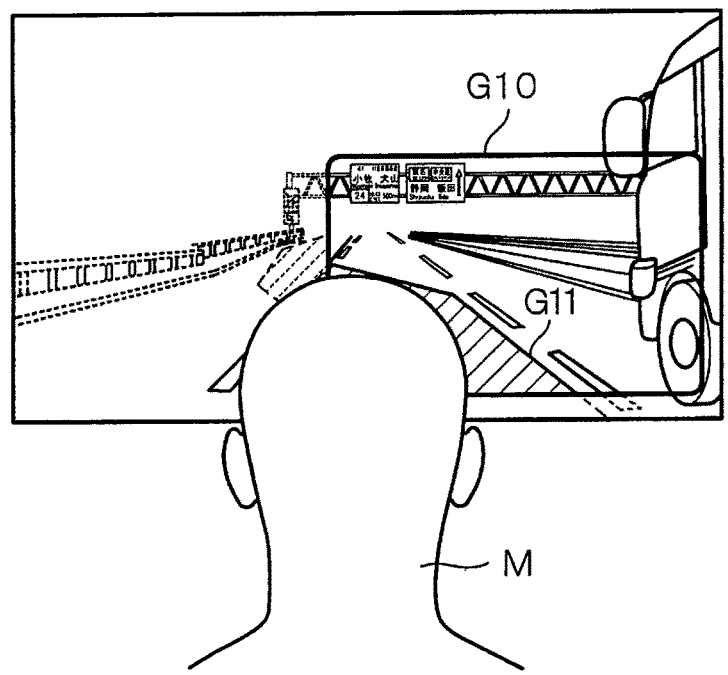
FIG. 5 is a diagram schematically showing a first example of a mode in which an image is displayed in a superimposed manner.

Then, the ECU 2 generates a frame image (G10, refer to FIG. 5, corresponding to a boundary image) indicating a display range of the projection surface (C) (S16), and transmits the frame image (G10) and the corrected converted image (G2), more strictly speaking, a display image (G 11) that falls within the converted image (G2) to the projection device 7 (S17). The transmitted frame image (G10) and the display image (G11) are projected onto the projection surface (C) by the projection device 7 as shown in FIG. 5.

As a result, the display image (G11) without distortion and accurately superimposed on the eyesight of the driver is displayed in the eyesight of the driver.

Meanwhile, when the size of the projection surface (C) is limited, there is a case in which the information to be notified the driver of, that is, the entire display image (G11) cannot be displayed. For example, in the case of FIG. 5, although the display image (G11) prompting a course change is displayed, a portion indicated by broken lines which is positioned on the left outer side of the frame image (G10) in the display image (G11) is not displayed.

For that reason, the ECU 2 determines whether to terminate the display, or not (S18). It should be noted that the case of terminating the display means terminating the notification to the driver. For example, when the vehicle passes through a traffic guide map while a display image is displayed on the traffic guide map, or when it can be confirmed that the driver has recognized the notified information, since there is no meaning to display the image anymore, the display of the image is terminated so as not to disturb the eyesight of the driver.

Then, when it is determined that the display is to be terminated (yes in S18), the ECU 2 terminates the processing. On the other hand, if it is determined that the display is not to be terminated (no in S18), the ECU 2 moves to Step S12 and repeats the processing after the identification of the viewpoint position of the driver. At this time, the reason that the process shifts to Step S12 is because when the viewpoint position of the driver changes, the display image (G11) is displayed following the change in the viewpoint position of the driver. As a result, the display image (G11) corresponding to the change in the viewpoint position of the driver is notified.

Figure 6:
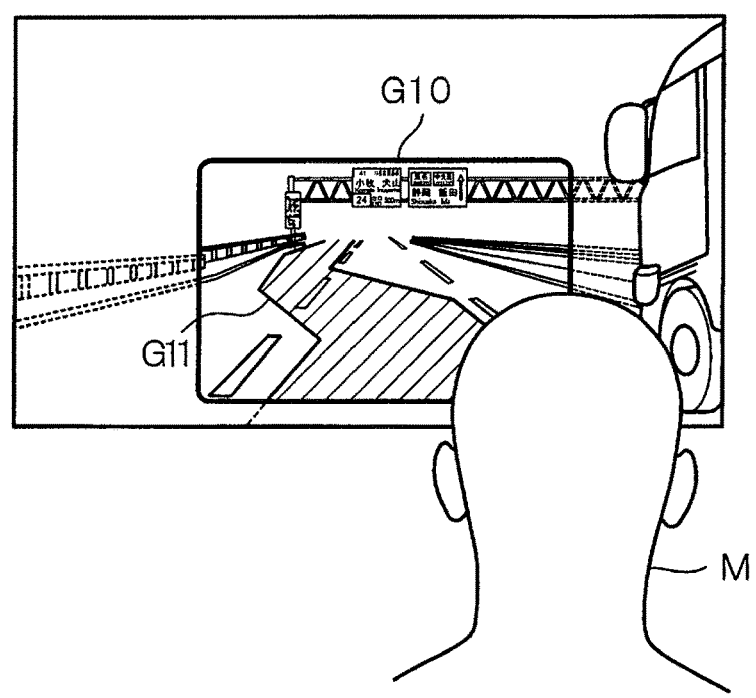
FIG. 6 is a diagram schematically showing a second example of the mode in which the image is displayed in the superimposed manner.

Specifically, when the left side of the display image (G11) is cut, in order to know what is on the left side of the display image (G11), the driver moves his face to the right as shown in FIG. 6. In other words, when it is desired to know what is on the left side of the display image (G11), the driver puts his face to an opposite direction of the left side, that is, the right side.

This is easy to understand if it is assumed that the frame image (G10) is a window frame. If there is a window in a building and a person want to see the left side that cannot be seen from the window, the person shifts his face to the right side. In other words, when the position of the face of the driver shifts, the image to be displayed is opposite to ta moving direction of the driver's face.

For that reason, the ECU 2 displays the frame image (G10) in order to intuitively notify the driver of to which side the face is to be shifted to make a portion not displayed visible. It should be noted that the same is applied to a case in which the position of the face moves not only in a horizontal direction, but also in a vertical direction.

The frame image (G11) is not limited to a rectangular frame illustrated in FIG. 5, but may be an L shape or a cross shape indicating four corners, or may be indicated by a broken line, a double line, or the like instead of a solid line. In other words, any image may be used as long as the image can notify the driver of a boundary of the projection surface (C), that is, a limit of the display range.

In this manner, the ECU 2 displays the image projected from the projection device 7 accurately so as to be superimposed on the real scenery viewed by the driver.

According to the embodiment described above, the following advantages can be obtained.

The ECU 2 includes: the image generation unit 10a that generates the image in the coordinate system based on the viewpoint position of the camera 3 which captures the traveling direction of the vehicle 20, the viewpoint position identification unit 10b that identifies the viewpoint position of the driver; the superimposed position identification unit 10c that identifies the display position at which to display the image (G1) in the eyesight of the driver, the image conversion unit 10d that generates the converted image (G2) obtained by converting the image (G1) into the coordinate system based on the viewpoint position of the driver, and the notification unit 10e that displays the display image (G11) falling within the converted image so as to be superimposed on the eyesight of the driver with the use of the projection device 7.

As a result, the display image (G1) generated so as to be superimposed on the scenery in the eyesight of the camera 3 is converted into the converted image (G2) which is superimposed on the scenery in the eyesight of the driver. Then, the display image (G11) that falls within the converted image is displayed so as to be superimposed on the eyesight of the driver. Therefore, the image projected from the projection device 7 can be accurately displayed so as to be superimposed on the real scenery viewed by the driver.

In other words, even if the scenery changes due to the movement of the vehicle 20, or the viewpoint position changes due to a fact that the driver stirs or the like, the image is generated, converted, and displayed in real time according to the change. As a result, the positional deviation of the display position can be prevented from occurring, the image having the displaced display position can be prevented from being continuously displayed, and the image can be accurately displayed in a state of being superimposed on the real scenery viewed by the driver. Therefore, the driver can be prevented from feeling uncomfortable.

Also, an image that can be superimposed on the actually viewed image even if the viewpoint is not at a fixed position is generated, thereby being capable of stably providing the advantages of the superimposed display on the real scenery.

At this time, at the time of conversion from the viewpoint position of the camera 3 to the viewpoint position of the driver, the conversion processing is performed not on the entire display surface to be finally displayed but only on a target figure to be superimposed. As a result, a processing load can be reduced.

The ECU 2 corrects the converted image (G2) according to the shape of the projection surface (C) and displays the corrected converted image (G2) so as to be superimposed on the eyesight of the driver. As a result, even when the projection surface (C) is formed, for example, in a curved shape along the windshield 31, an image without distortion can be displayed so as to be superimposed on the scenery when viewed from the driver.

The ECU 2 corrects the converted image (G2) according to the viewpoint position of the driver and displays the corrected converted image (G2) so as to be superimposed on the eyesight of the driver. As a result, even if the position of the face of the driver is changed, the image without distortion can be displayed so as to be superimposed on the scenery when viewed from the driver.

The ECU 2 converts the image (G1) according to the movement of the viewpoint position of the driver. As shown in FIGS. 5 and 6, when the position of the face is shifted, the appearance also differs. For that reason, the image (G1) is regenerated, thereby being capable of displaying the display image (G11) according to the position of the face. In this case, the generated image (G1) may be stored in advance and reconverted according to the movement of the viewpoint position.

In this case, for example, when the vehicle passes through a traffic guide map while a display image is displayed on the traffic guide map, or when it can be confirmed that the driver has recognized the notified information, the display of the image is terminated, thereby being capable of reducing the possibility of interfering with the eyesight of the driver.

The ECU 2 generates the frame image (G10; the boundary image) indicating the display range of the projection surface (C). This makes it possible for the driver to intuitively grasp that it is sufficient to shift his face to the right side when, for example, the left side of the display image (G11) is cut.

Similarly, with a vehicle program causing the ECU 2 to execute: a process of generating the image (G1) in the coordinate system based on the viewpoint position of the camera 3, a process of identifying the viewpoint position of the driver; a process of identifying the display position at which to display the image (G1) in the eyesight of the driver, a process of generating the converted image (G2) obtained by converting the image (G1) into the coordinate system based on the viewpoint position of the driver, and a process of displaying the display image (G11) falling within the converted image (G2) so as to be superimposed on the eyesight of the driver, the same advantages as those in the ECU 2 can be obtained such that the image projected from the projection device 7 can be accurately displayed so as to be superimposed on the real scenery viewed by the driver, and so on.

Other Embodiments

The present disclosure is not limited to the exemplifications of the above embodiment, but can be arbitrarily modified and expanded without departing from the spirit of the exemplifications.

In the embodiment, the example in which the image to be superimposed on the object in the eyesight is generated and converted is shown. Alternatively, not the image superimposed on the entire object, that is, the image whose interior is painted out, but an image indicative of a contour of the object may be displayed. In that case, a contour image indicating the contour of the object may be generated in Step S10 of FIG. 4, the contour image may be converted in Step S13, and the converted image may be corrected in Step S15. For example, when the image is displayed so as to be superimposed on a traffic sign, since the traffic sign per se is easily visible when the image is not superimposed on the traffic sign, only the contour of the traffic sign is indicated, thereby being capable of performing both of notification to the driver and an improvement in the visibility of the driver.

In addition, when the image whose interior is painted out is merely displayed, an outline image indicating the outline of the image may be first generated in Step S10, the outline image may be converted in Step S13, the converted image may be corrected in Step S15, and the interior of the converted image may be painted out and displayed in Step S17. Consequently, there is no need to perform the conversion process on the interior of the image, and the interior of the image may be merely painted out when displaying, as a result of which a reduction in the processing load can be expected.

In the embodiment, the example in which the image (G1) is generated based on the viewpoint position of the driver is shown, but in more detail, the image (G1) may be generated with the dominant eye of the driver as a starting point, for example, with the right eye of the driver as the dominant eye in FIG. 2 or 3. As a result, a coincidence rate of superimposition with the actually viewed image increases, and an image without discomfort can be displayed. In that case, the dominant eye can be acquired based on a cut of the image that falls within the display range of the projection surface and a position of the face identified in Step 12 in FIG. 4 relative to the cut.

In the embodiment, the example in which the image is displayed based on the viewpoint position of the driver is shown. Alternatively, a change in the viewpoint position of the driver in chronological order may be stored as a movement history in the storage unit 11 or the like, the position of the face of the driver may be estimated based on the travel history, and the image to be displayed may be corrected based on the estimation. In other words, the image conversion unit 10d may perform the conversion of the image and the correction according to the shape of the projection surface (C) so as to correspond to the viewpoint position estimated by the estimation unit 10f.

As described above, the change in the viewpoint position is estimated in this manner and the image is converted and corrected proactively based on the estimation. As a result, compared with a case in which the image is converted and corrected after detecting the change in the position of the face, a processing delay can be reduced, and a display delay of the image can be improved.

In that case, the movement of the position of the driver's face may be estimated based on not only the travel history of the viewpoint position of the driver but also to which of the top, bottom, right and left of the projection surface (C) a portion of the display image (G11) which is not displayed is located. This is because if the image falls outside the display range and is interrupted, the user is supposed to move the position of his face in an attempt to view the interrupted portion.

In the embodiment, the example in which the converted image (G1) is corrected according to the surface shape of the projection surface (C) and the viewpoint position of the driver is shown. Alternatively, the correction may be performed according to any one of the surface shape and the viewpoint position depending on the surface shape of the projection surface (C) and the positional relationship with the viewpoint position of the driver.

In the embodiment, the example in which the ECU 2 and the projection device 7 are provided separately is shown. Alternatively, the ECU 2 and the projection device 7 may be provided integrally. In other words, the projection device 7 may be equipped with the function of the ECU 2. Alternatively, a drive recorder device or a navigation apparatus already connectable to the camera 3, a tablet terminal or a smartphone owned by the driver, or the like may be installed with the function of the ECU 2.

In the embodiment, the example in which the converted image is regenerated according to the movement of the viewpoint position of the driver is shown. Alternatively, the converted image may be stored in advance and the converted image may be corrected again according to the movement of the viewpoint position.

In the embodiment, the example in which only the image is displayed is shown. Alternatively, characters and the like can be displayed in a state without distortion by converting the shape similarly to the conversion mode from the image (G1) to the display image (G10).

In the embodiment, the image is used, but the display image (G10) may be either a still image or a moving image.

With the configuration of the embodiment described above, the scenery viewed from the position of the driver's eyes and the image projected on the projection plane (C) can be superimposed on each other. However, since factors that have not yet been elucidated such as a structure of the human eye, and a method of recognizing the figure by the brain exist, it is conceivable that the image displayed on the projection surface (C) is felt as displaced from the scenery or distorted due to the above factors.

The above case can be handled by previously designing a coordinate conversion filter in which correction amounts and the like are set such that, for example, straight lines can be correctly recognized as straight lines at a stage prior to actual use by the driver, such as at the time of testing by the ECU 2.

Figure 7:
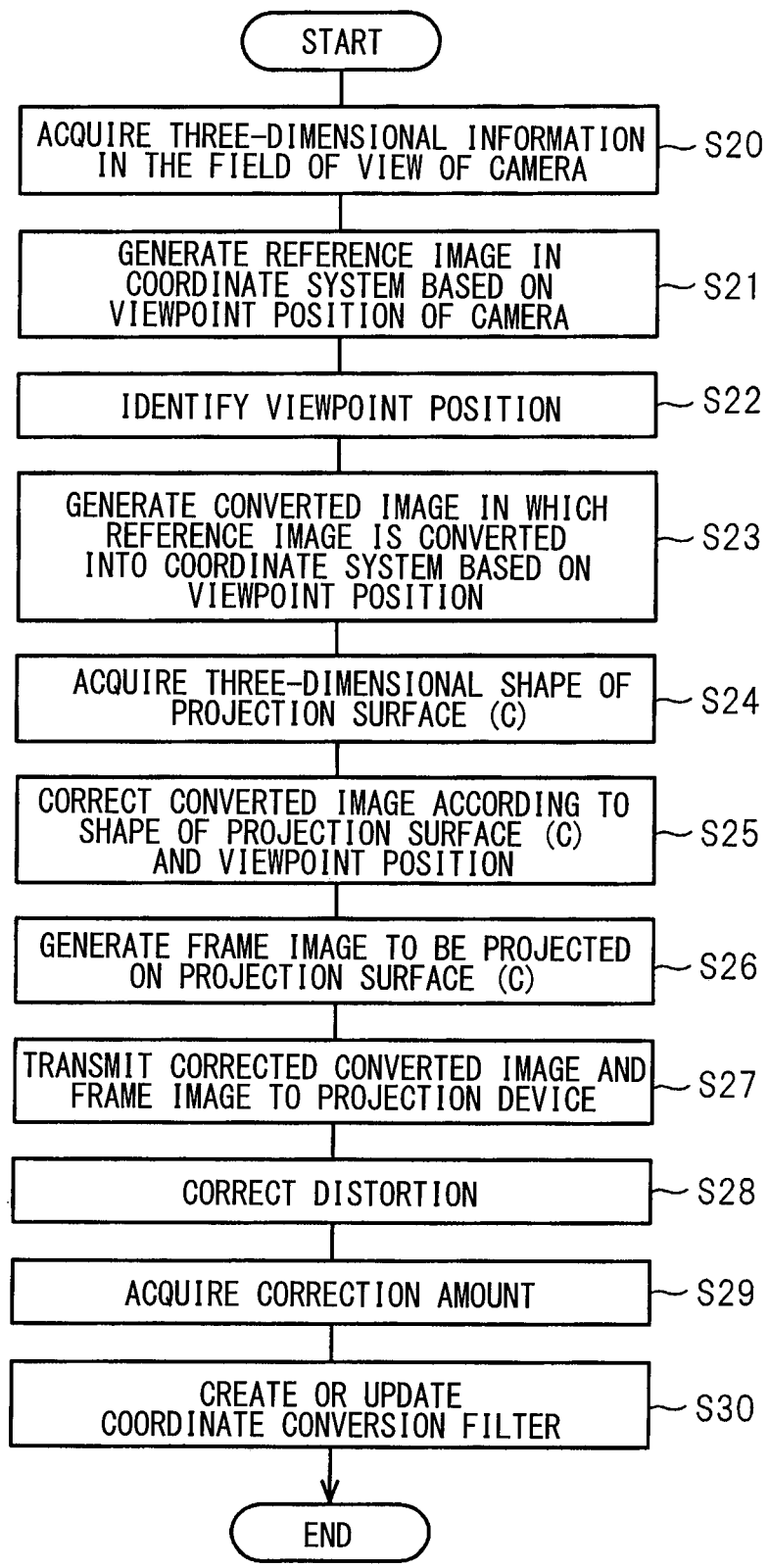
FIG. 7 is a diagram showing a flow of coordinate conversion filter generation processing by an ECU according to another embodiment.

More specifically, with the execution of a filter design program shown in FIG. 7, the coordinate conversion filter is designed. Since there is processing in FIG. 7 which is substantially the same as the processing of FIG. 4 of the embodiment, a detailed description of the same processing will be omitted.

When the ECU 2 acquires three-dimensional information in Step S10 (S20), the ECU 2 generates a reference image (S21). The reference image is a relatively simple figure such as a lattice figure configured by a right angle, for example. Subsequently, the ECU 2 identifies the viewpoint position of a tester sitting in the driver's seat (S2), and generates a converted image obtained by converting the reference image into a coordinate system based on the identified viewpoint position (S23).

When the converted image is generated, the ECU 2 acquires the shape of the projection surface (C) (S21), corrects the converted image according to the shape of the projection surface (C) and the viewpoint position (C25), generates a frame image (S26), transmits the corrected converted image and the frame image to the projection device (S27), and displays an image on the projection surface (C).

Then, the ECU 2 corrects a distortion of the displayed image (S28). Strictly speaking, in Step S28, the ECU 2 corrects the distortion of the image being displayed according to the tester's operation of correcting the image so as to be correctly viewed.

Subsequently, the ECU 2 acquires the correction amount at the time of correcting the distortion of the image (S29) and creates or updates the coordinate conversion filter by associating the correction amount as the correction amount for the current viewpoint position (S30). When the processing shown in FIG. 7 is executed for the first time, the coordinate conversion filter is newly created in Step S30, and in the case where the processing shown in FIG. 7 is executed for the second time or later, the coordinate conversion filter is updated in Step S30. In other words, the coordinate conversion filter capable of identifying the correction amount according to the viewpoint position is designed.

The processing of FIG. 7 is repetitively performed while changing the viewpoint position, as a result of which the coordinate conversion filter in which the viewpoint position of the driver and the correction amount at the viewpoint position are associated with each other is updated.

This makes it possible to deal with the factors which cannot be elucidated, and to display an image that the driver feels more easily visible. In that case, the coordinate conversion filter may be designed in advance, or may be generated after the driver's use starts.

The coordinate conversion filter is used during actual operation as follows.

Figure 8:
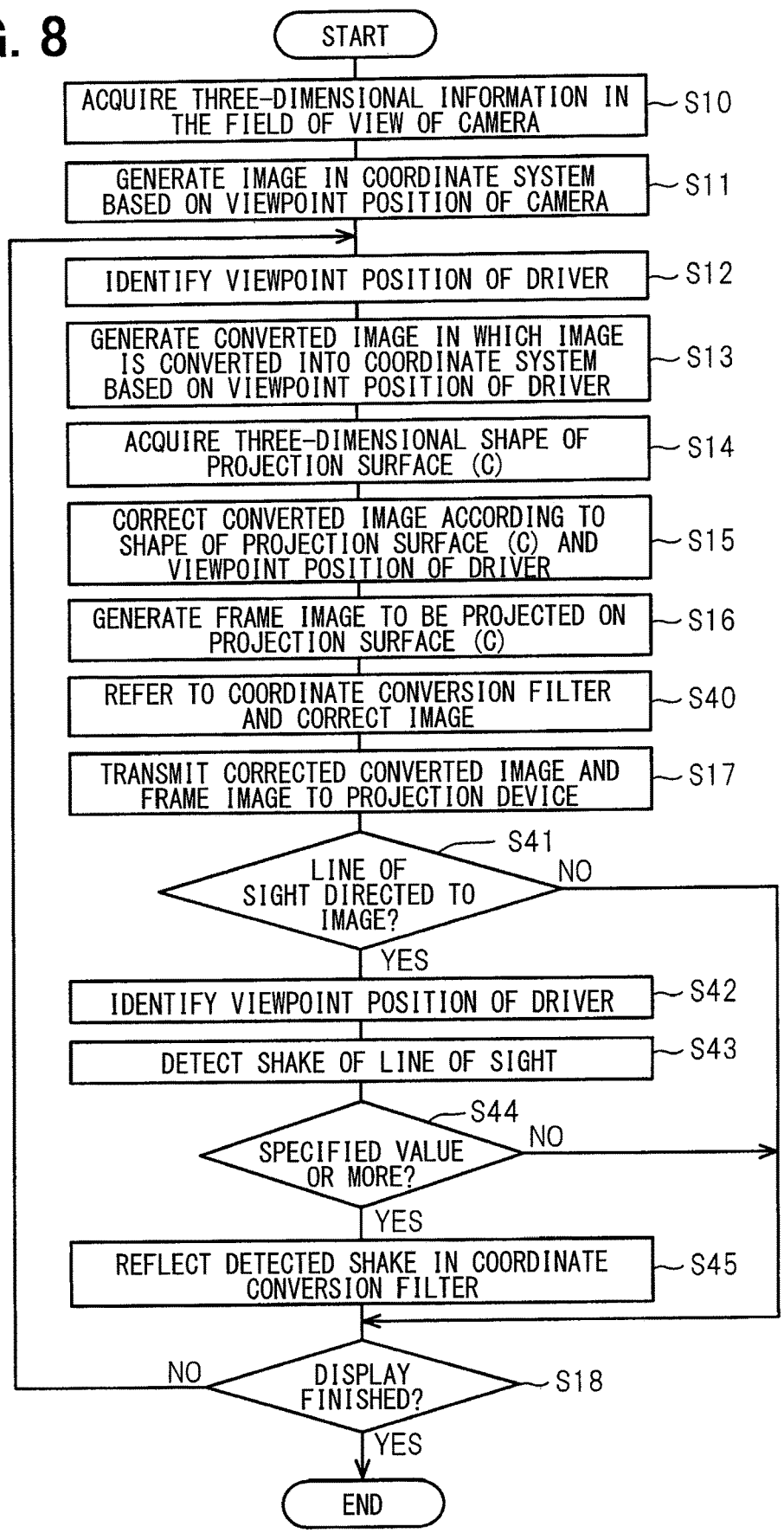
FIG. 8 is a diagram showing a first example of a flow of a vehicle program by an ECU according to another embodiment.

The ECU 2 executes a vehicle program shown in FIG. 8. In FIG. 8, the same processes as those in FIG. 4 of the embodiment are denoted by the same step numbers, and a detailed description of the same processes will be omitted.

Similarly to the embodiment, the ECU 2 executes the processing from Step S1. Upon completion of the correction of the converted image (S15) and the generation of the frame image (S16), the ECU 2 refers to the coordinate conversion filter described above and finally corrects the image (S40). In Step S40, the correction by the associated correction amount is performed based on the viewpoint position of the driver. The processing of Step S40 is performed by the coordinate transformation unit 10d.

Subsequently, after transmitting the corrected image and the frame image (S17) and displaying the images, the ECU 2 determines whether the line of sight of the driver is facing the displayed image (S41). If the line of sight of the driver is facing the displayed image (yes in S41), the ECU 2 detects the shake of the line of sight (S42). At this time, the shake of the line of sight is detected as a deviation amount between the center of sight line of the driver and the display position of the image. The line of sight can be identified by detecting a direction of the line of sight together with the identification of the viewpoint position by the viewpoint position identification unit.

When the detected shake is equal to or more than a specified value (yes in S43), the ECU 2 determines that the display position of the image deviates from the driver's consciousness and reflects the detected shake on the coordinate conversion filter (S44). As a result, the correction amount for the driver, that is, learning of the coordinate conversion filter is performed. When the line of sight is facing the image (no in S41) or the shake is less than the specified value (no in S43), the process is completed as it is.

As a result, when the shake of the line of sight is detected at the time of displaying the image, it can be determined that the display position does not match the sense of the driver. Then, the shake of the line of sight is reflected in the coordinate conversion filter, thereby being capable of dealing with the individual factors for each driver as well as general factors which cannot be elucidated.

Although it is naturally predictable that drivers are different, it is naturally expected that drivers will not change fundamentally. In addition, the vehicle used when designing the coordinate conversion filter in advance may be different from the vehicle in which the ECU 2 is actually provided. For that reason, the coordinate conversion filter may be newly created in order to correspond to different drivers every time the vehicle is used, or a state of the past driving may be saved in order to correspond to the same driver. It is needless to say that the coordinate conversion filter is newly created according to an operation from the driver.

Figure 9:
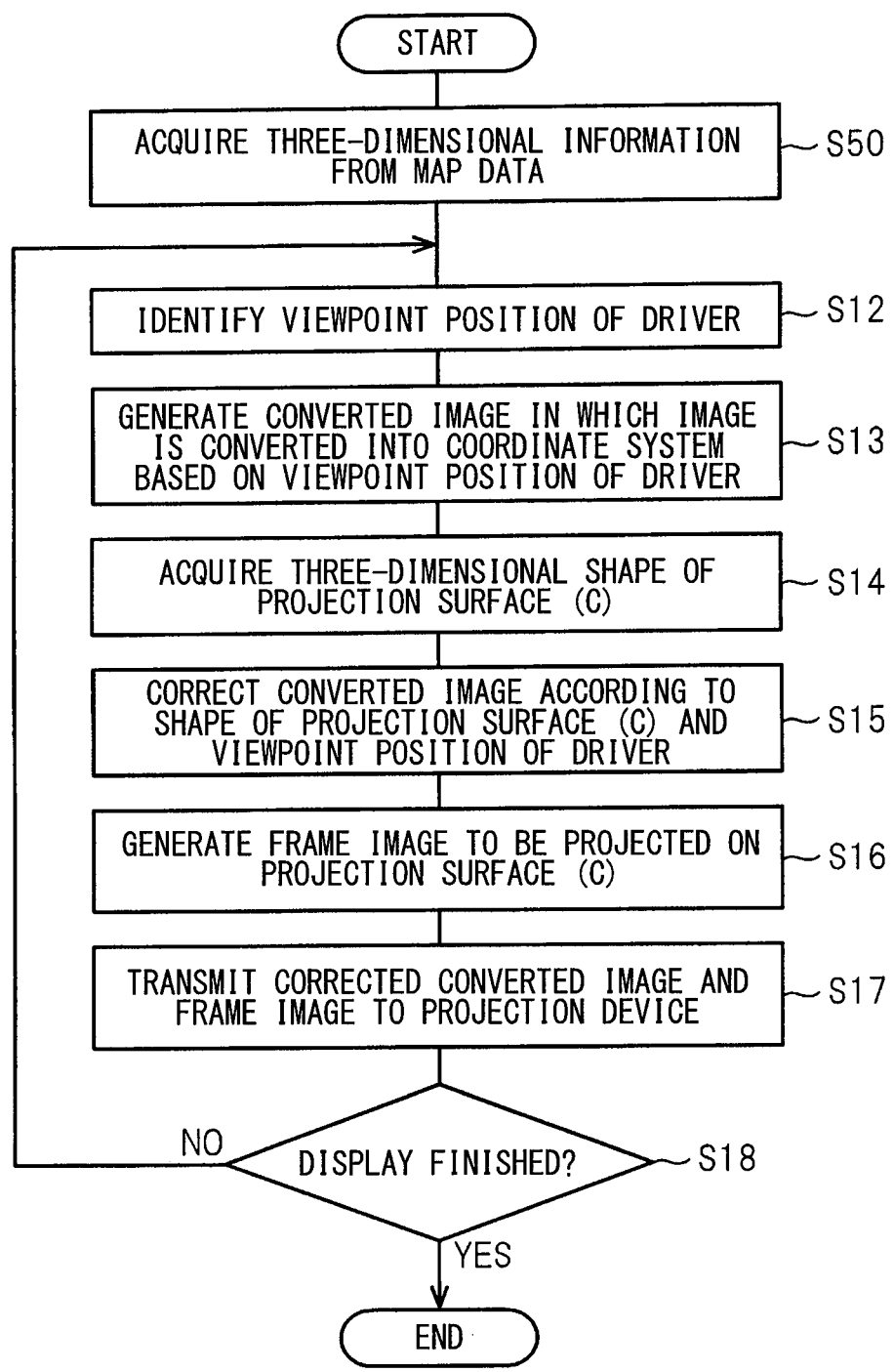
FIG. 9 is a diagram showing a second example of the flow of the vehicle program by the ECU according to another embodiment.

In the embodiment, the example of generating the image based on the three-dimensional space identified based on the image captured by the camera 3 is described. Alternatively, high-precision data capable of identifying the scenery or the like at the current position is stored in the map data 13a in advance, and the three-dimensional space based on an absolute space identified from the map data 13a may be referred to. In other words, the reference coordinate system may be set based on the map data 13a. In that case, as shown in FIG. 9, the three-dimensional information is acquired based on the map data 13a in Step S50 and the processing after Step S12 is performed as in the embodiment, thereby being capable of realizing the reference coordinate system.

Even with the configuration described above, as in the embodiment, the image projected from the projection device 7 can be accurately displayed so as to be superimposed on the real scenery viewed by the driver.

The present disclosure has been described with reference to the embodiments, but the present disclosure is not limited to the embodiments or the structures. The present disclosure includes various modification examples and modifications within the equivalent range. In addition, it should be understood that various combinations or aspects, or other combinations or aspects, in which only one element, one or more elements, or one or less elements are added to the various combinations or aspects, also fall within the scope or technical idea of the present disclosure.

What is claimed is:

1. A vehicle device that notifies a driver of information using a projection device that displays an image on a projection surface, the vehicle device comprising:
    an image generation unit that generates the image to be notified to the driver in a predetermined reference coordinate system;
    a viewpoint position identification unit that identifies a viewpoint position of the driver indicative of a positional relationship between a position of the driver's eye in a vehicle compartment and the projection surface, the position of the driver's eye being detected by and received from a viewpoint detection unit that detects the position of the driver's eye using image processing;
    a superimposed position identification unit that identifies a display position, at which the image generated by the image generation unit is displayed within an eyesight of the driver, based on the viewpoint position of the driver;
    an image conversion unit that generates a converted image obtained by converting the image generated by the image generation unit into a coordinate system having the viewpoint position of the driver as a reference point; and
    a notification unit that notifies the driver of the information by displaying the converted image to be superimposed on the eyesight of the driver with the projection device;
    wherein:
    the image conversion unit corrects the converted image according to a shape of the projection surface; and
    the notification unit displays a corrected converted image to be superimposed within the eyesight of the driver.

2. A vehicle device that notifies a driver of information using a projection device that displays an image on a projection surface, the vehicle device comprising:
    an image generation unit that generates the image to be notified to the driver in a predetermined reference coordinate system;
    a viewpoint position identification unit that identifies a viewpoint position of the driver indicative of a positional relationship between a position of the driver's eye in a vehicle compartment and the projection surface, the position of the driver's eye being detected by and received from a viewpoint detection unit that detects the position of the driver's eye using image processing;
    a superimposed position identification unit that identifies a display position, at which the image generated by the image generation unit is displayed within an eyesight of the driver, based on the viewpoint position of the driver;
    an image conversion unit that generates a converted image obtained by converting the image generated by the image generation unit into a coordinate system having the viewpoint position of the driver as a reference point; and
    a notification unit that notifies the driver of the information by displaying the converted image to be superimposed on the eyesight of the driver with the projection device;
    wherein:
    the image conversion unit corrects the converted image according to the viewpoint position of the driver; and
    the notification unit displays a corrected converted image to be superimposed within the eyesight of the driver.

3. A vehicle device that notifies a driver of information using a projection device that displays an image on a projection surface, the vehicle device comprising:
    an image generation unit that generates the image to be notified to the driver in a predetermined reference coordinate system;
    a viewpoint position identification unit that identifies a viewpoint position of the driver indicative of a positional relationship between a position of the driver's eye in a vehicle compartment and the projection surface, the position of the driver's eye being detected by and received from a viewpoint detection unit that detects the position of the driver's eye using image processing;
    a superimposed position identification unit that identifies a display position, at which the image generated by the image generation unit is displayed within an eyesight of the driver, based on the viewpoint position of the driver;
    an image conversion unit that generates a converted image obtained by converting the image generated by the image generation unit into a coordinate system having the viewpoint position of the driver as a reference point; and
    a notification unit that notifies the driver of the information by displaying the converted image to be superimposed on the eyesight of the driver with the projection device;
    wherein:
    the image conversion unit reconverts the image generated by the image generation unit according to a movement of the viewpoint position of the driver.

4. The vehicle device according to claim 1, wherein:
    the image generation unit generates a boundary image that is an image to be displayed on the projection surface and indicates a display range of the projection surface; and
    the notification unit displays the boundary image together with the converted image to be superimposed within the eyesight of the driver.

5. The vehicle device according to claim 1, wherein:
    the image conversion unit converts the image generated by the image generation unit to have a driver's dominant eye as a starting point.

6. The vehicle device according to claim 1, further comprising:
    an estimation unit that estimates the viewpoint position of the driver based on a travel history indicating a change in the viewpoint position of the driver in a chronological order, wherein:

the image conversion unit converts the image generated by the image generation unit to according to the viewpoint position corresponding to an estimated position of a face.

7. The vehicle device according to claim 1, wherein:
the image generation unit generates the image to be notified by the notification unit to the driver using a coordinate system having a three-dimensional space identified by an attachment position of an imaging unit as the reference coordinate system.

8. The vehicle device according to claim 1, wherein:
the image generation unit generates the image to be notified by the notification unit to the driver using a coordinate system having a three-dimensional space identified by map data as the reference coordinate system.

9. The vehicle device according to claim 1, wherein:
the image conversion unit converts the image generated by the image generation unit or corrects the converted image using a coordinate conversion filter designed according to a vision of an actual human who views the image from a driver's seat.

10. A non-transitory tangible computer readable medium comprising instructions being executed by a computer, the instructions including a computer-implemented method for controlling a control unit for a vehicle device, which notifies a driver of information using a projection device that displays an image on a projection surface the instructions including:
generating the image to be notified to the driver in a predetermined reference coordinate system;
identifying a viewpoint position indicative of a positional relationship between a position of the driver's eye in a vehicle compartment and the projection surface, the position of the driver's eye being detected by and received from a viewpoint detection unit that detects the position of the driver's eye using image processing;
identifying a display position, at which the image generated by the image generation unit is displayed within an eyesight of the driver, based on the viewpoint position of the driver;
generating a converted image obtained by converting the image generated by the image generation unit into a coordinate system having the viewpoint position of the driver as a reference point;
notifying the driver of the information by displaying the converted image to be superimposed on the eyesight of the driver with the projection device;
correcting the converted image according to a shape of the projection surface; and
displaying a corrected converted image to be superimposed within the eyesight of the driver.

11. A non-transitory tangible computer readable medium comprising instructions being executed by a computer, the instructions including a computer-implemented method for controlling a control unit for a vehicle device, which notifies a driver of information using a projection device that displays an image on a projection surface, the instructions including:
generating a reference image to be notified in a predetermined reference coordinate system;
identifying a viewpoint position indicative of a positional relationship between a position of an eye of a person disposed in a driver's seat and the projection surface, the position of the eye being detected by and received from a viewpoint detection unit that detects the position of the eye of the person disposed in the driver's seat using image processing;
identifying a display position, at which the image generated by the image generation unit is displayed within an eyesight based on an identified viewpoint position;
generating a converted image obtained by converting the image generated by the image generation unit into a coordinate system having the viewpoint position of the person disposed in the driver's seat based on the identified viewpoint position;
displaying the converted image to be superimposed on the eyesight of the driver with the projection device;
correcting distortion of a displaying image according to an operation of the person disposed in the driver's seat;
acquiring a correction amount when correcting the distortion of the image;
designing a coordinate conversion filter in which the correction amount at the viewpoint position is identified by connecting an acquired correction amount and the viewpoint position to each other
correcting the converted image according to a shape of the projection surface; and
displaying a corrected converted image to be superimposed within the eyesight of the driver.

* * * * *